US008358081B2

(12) United States Patent
Panagotacos et al.

(10) Patent No.: US 8,358,081 B2
(45) Date of Patent: Jan. 22, 2013

(54) LAMP ASSEMBLY

(75) Inventors: George W. Panagotacos, Corona, CA (US); David G. Pelka, Los Angeles, CA (US)

(73) Assignee: Teledyne Technologies Incorporated, Thousand Oaks, CA (US)

( * ) Notice: Subject to any disclaimer, the term of this patent is extended or adjusted under 35 U.S.C. 154(b) by 565 days.

(21) Appl. No.: 12/545,540

(22) Filed: Aug. 21, 2009

(65) Prior Publication Data
US 2011/0043120 A1 Feb. 24, 2011

(51) Int. Cl.
*H05B 37/02* (2006.01)
(52) U.S. Cl. ......... 315/224; 315/295; 315/307; 315/313
(58) Field of Classification Search .................. 315/224, 315/294–295, 297, 307, 313; 362/470
See application file for complete search history.

(56) References Cited

U.S. PATENT DOCUMENTS

| | | | |
|---|---|---|---|
| 4,337,759 A | 7/1982 | Popovich et al. | |
| 5,404,869 A * | 4/1995 | Parkyn et al. | 126/699 |
| 5,655,832 A | 8/1997 | Pelka et al. | |
| 6,527,411 B1 * | 3/2003 | Sayers | 362/245 |
| 6,814,470 B2 * | 11/2004 | Rizkin et al. | 362/327 |
| 6,846,099 B2 * | 1/2005 | Dubin et al. | 362/470 |
| 7,059,731 B2 * | 6/2006 | Lee et al. | 353/99 |
| 7,172,319 B2 * | 2/2007 | Holder et al. | 362/341 |

(Continued)

OTHER PUBLICATIONS

International Search Report and Written Opinion mailed Nov. 24, 2010 in International Application No. PCT/US2010/46214.

(Continued)

*Primary Examiner* — James H Cho
(74) *Attorney, Agent, or Firm* — K&L Gates LLP

(57) ABSTRACT

A lamp assembly including one or more light emitting diode (LED) arrays and a controller circuit to output a current to the one or more LED arrays. Each LED array includes at least one LED and defines a spatial radiation pattern having a first central axis. The lamp assembly also includes a lens array to redirect light received from the one or more LED arrays, a base and a light-transmissive cover. For each one of the one or more LED arrays, the lens array includes a total internal reflection (TIR) lens defining a second central axis aligned with the first central axis of the corresponding LED array. The TIR lens is configured to distribute light received from the LED array from an output face of the TIR lens such that the distributed light defines optical paths that are convergent, divergent or collimated with respect to the second central axis. The base includes a first surface to receive the one or more LED arrays, the controller circuit and the lens array. The base also includes a second surface structured to be removably received by a lamp holder. The light-transmissive cover is attached to the base and disposed over the first surface thereof such that the one or more LED arrays, the controller circuit and the lens array are contained between the cover and the base.

25 Claims, 17 Drawing Sheets

U.S. PATENT DOCUMENTS

| | | | |
|---|---|---|---|
| 7,233,115 B2* | 6/2007 | Lys | 315/291 |
| 7,717,594 B2* | 5/2010 | Clark | 362/471 |
| 2003/0031028 A1 | 2/2003 | Murray et al. | |
| 2005/0207196 A1 | 9/2005 | Holmes et al. | |
| 2005/0212459 A1 | 9/2005 | Patel et al. | |
| 2006/0002110 A1 | 1/2006 | Dowling et al. | |
| 2006/0038510 A1 | 2/2006 | Lee et al. | |
| 2008/0094841 A1 | 4/2008 | Dahm | |
| 2008/0198615 A1* | 8/2008 | Klipstein | 362/538 |
| 2009/0086474 A1 | 4/2009 | Chou | |
| 2009/0225560 A1* | 9/2009 | Mukai et al. | 362/470 |

OTHER PUBLICATIONS

Pelka, et al., "An Overview of LED Applications for General Illumination", (Conference Proceedings Paper), SPIE vol. 5816, Nov. 2003.

Pelka, et al., Keen Forms of Kinoforms—Kinoform-based Diffusers Help Lighting Designers Leverage Unique LED Advantages, OE Magazine, vol. 3 No. 10, p. 19, Oct. 2003, printed from http://spie.org/x17721.xml?pf=tru&highlight=x2408&ArticleID=x17721, Internet site, accessed on Jan. 28, 2010, 3 pages.

* cited by examiner

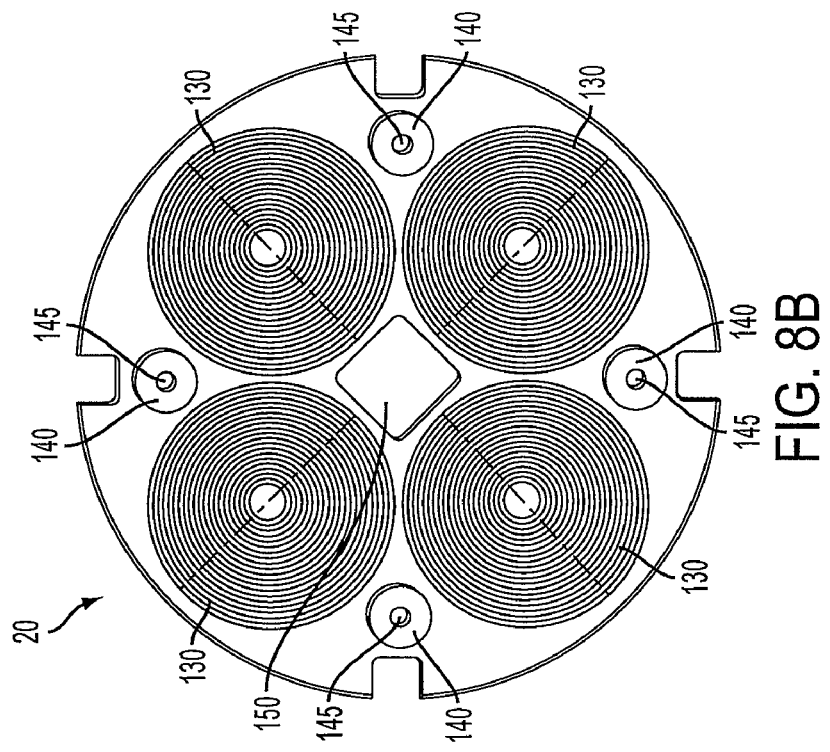
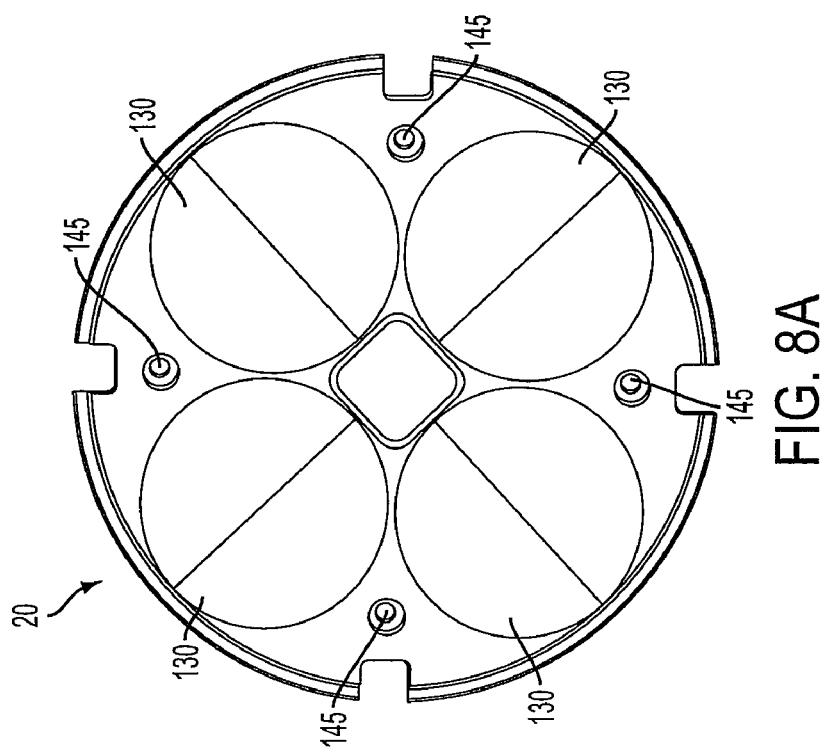

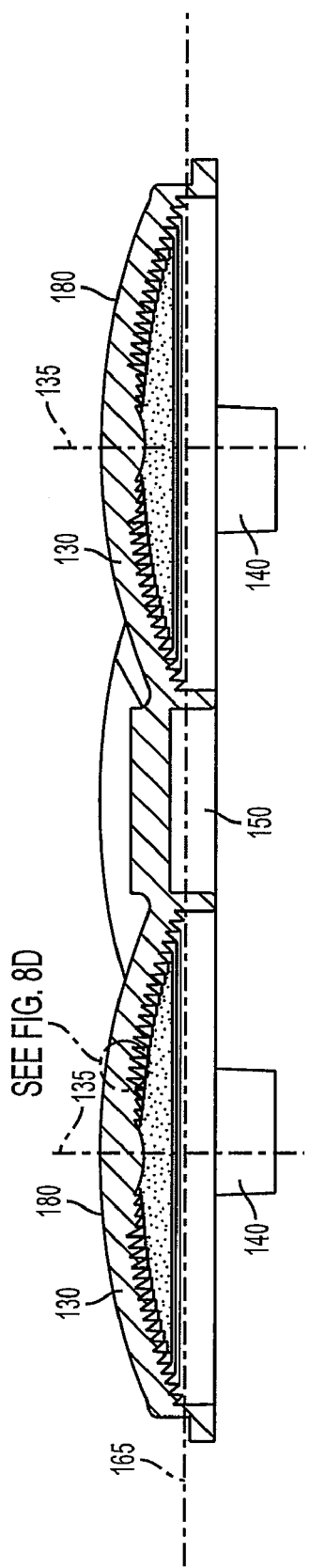
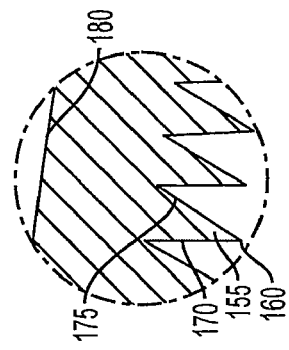
FIG. 8C
FIG. 8D

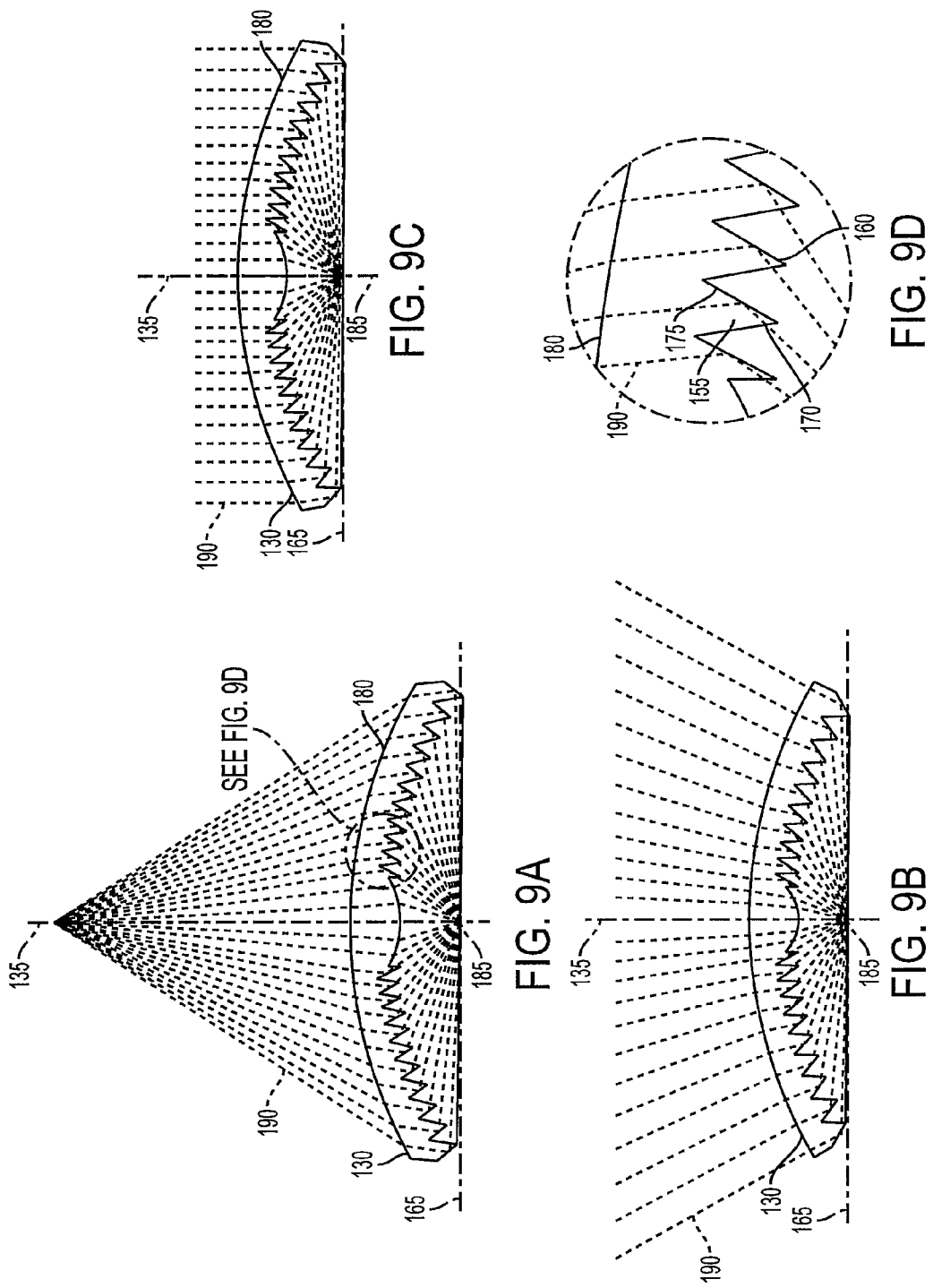

LAMP ASSEMBLY

BACKGROUND

Virtually all types of commercial and private aircraft include external lights, such as taxiing lights and landing lights, to ensure suitable visibility of the aircraft in a wide range of natural lighting conditions. Requirements dictating the number and placement of such lights, among other things, are typically embodied in regulations relating to airworthiness standards, such as Title 14 of the Code of Federal Regulations, Part 23. External aircraft lights typically utilize incandescent filament technology. Due to large inrush currents and exposure to high degrees of vibration, incandescent filament lamps are particularly susceptible to failure in an aircraft environment, and the operational life of an incandescent filament lamp on an aircraft may be relatively short when compared to the operational lives of similar lamps used in less harsh environments. This relatively short operational life may entail significant maintenance costs at the very least, and, in the event of lamp failure during aircraft operation, may jeopardize aircraft and passenger safety.

SUMMARY

In one general respect, this application discloses a lamp assembly including one or more light emitting diode (LED) arrays and a controller circuit to output a current to the one or more LED arrays. Each LED array includes at least one LED and defines a spatial radiation pattern having a first central axis. The lamp assembly also includes a lens array to redirect light received from the one or more LED arrays, a base and a light-transmissive cover. For each one of the one or more LED arrays, the lens array includes a total internal reflection (TIR) lens defining a second central axis aligned with the first central axis of the corresponding LED array. The TIR lens is configured to distribute light received from the LED array from an output face of the TIR lens such that the distributed light defines optical paths that are convergent, divergent or collimated with respect to the second central axis. The base includes a first surface to receive the one or more LED arrays, the controller circuit and the lens array. The base also includes a second surface structured to be removably received by a lamp holder. The light-transmissive cover is attached to the base and disposed over the first surface thereof such that the one or more LED arrays, the controller circuit and the lens array are contained between the cover and the base.

DESCRIPTION OF THE FIGURES

FIGS. 8A, 8B, 8C and 8D are front, back and cross-sectional views, respectively, of the lens array of FIG. 3;

FIGS. 9A, 9B, 9C and 9D illustrate re-direction of light emitted by a light source for different TIR lens configurations according to various embodiments;

DESCRIPTION

Before explaining the various embodiments in detail, it should be noted that the embodiments are not limited in their application or use to the details of construction and arrangement of parts illustrated in the accompanying drawings and description. The illustrative embodiments may be implemented or incorporated in other embodiments, variations and modifications, and may be practiced or carried out in various techniques. The lamp assembly configurations disclosed below are illustrative only and not meant to limit the scope or application thereof. Furthermore, unless otherwise indicated, the terms and expressions employed herein have been chosen for the purpose of describing the illustrative embodiments for the convenience of the reader and are not to limit the scope thereof.

Figure 1B:
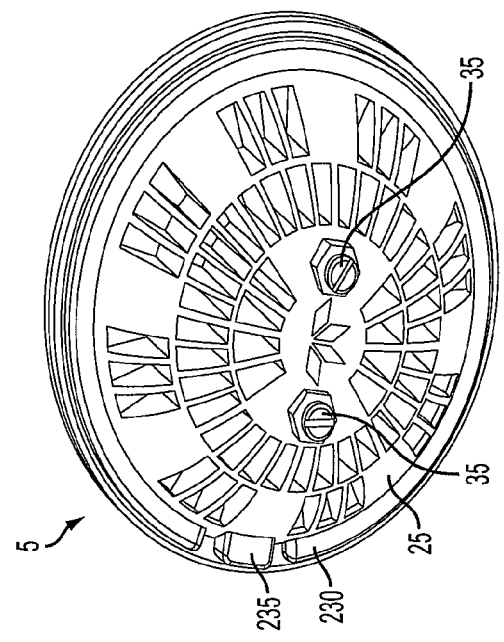
FIGS. 1A, 1B and 1C are perspective views of a front, back and side, respectively, of a lamp assembly according to one embodiment.
Figure 1C:
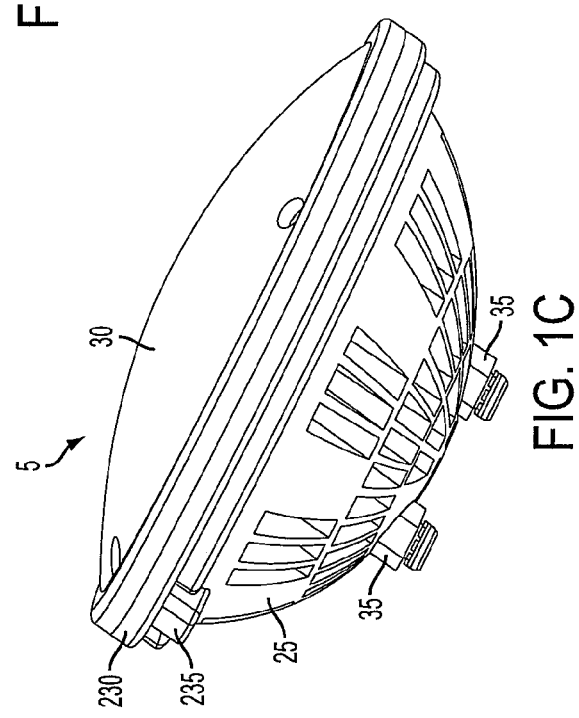
Figure 1A:
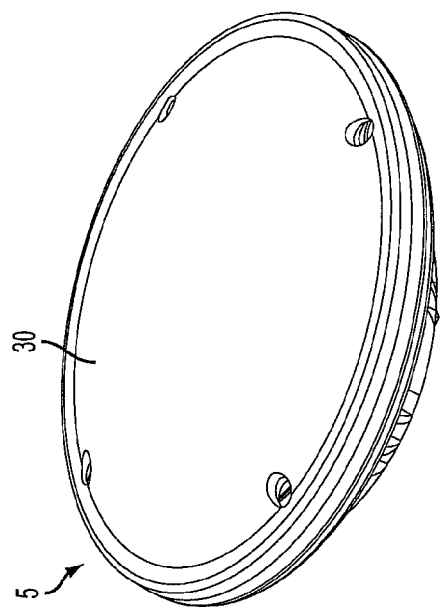
Figure 2:
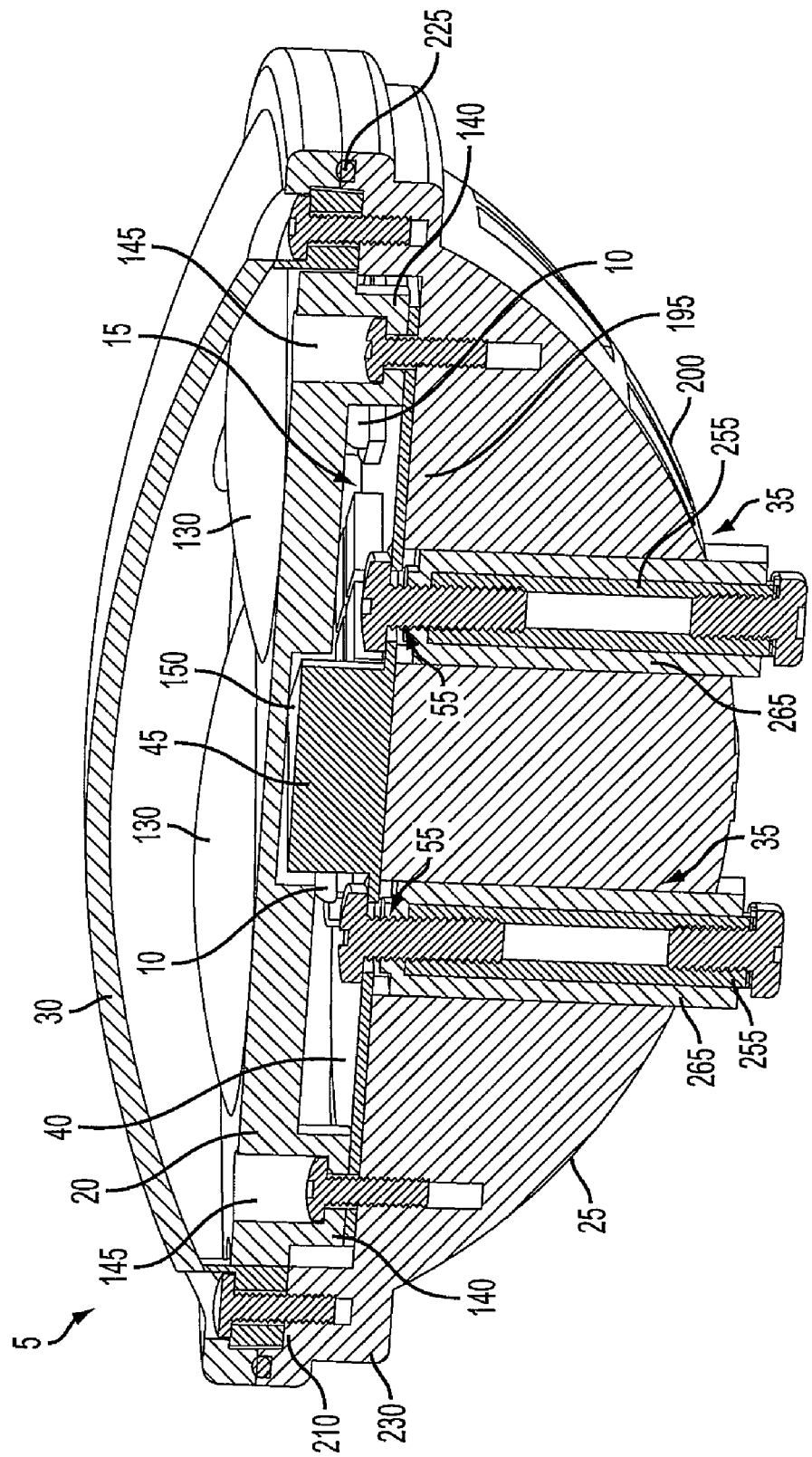
FIG. 2 is a perspective cross-sectional view of the lamp assembly of FIGS. 1A-1C.
Figure 3:
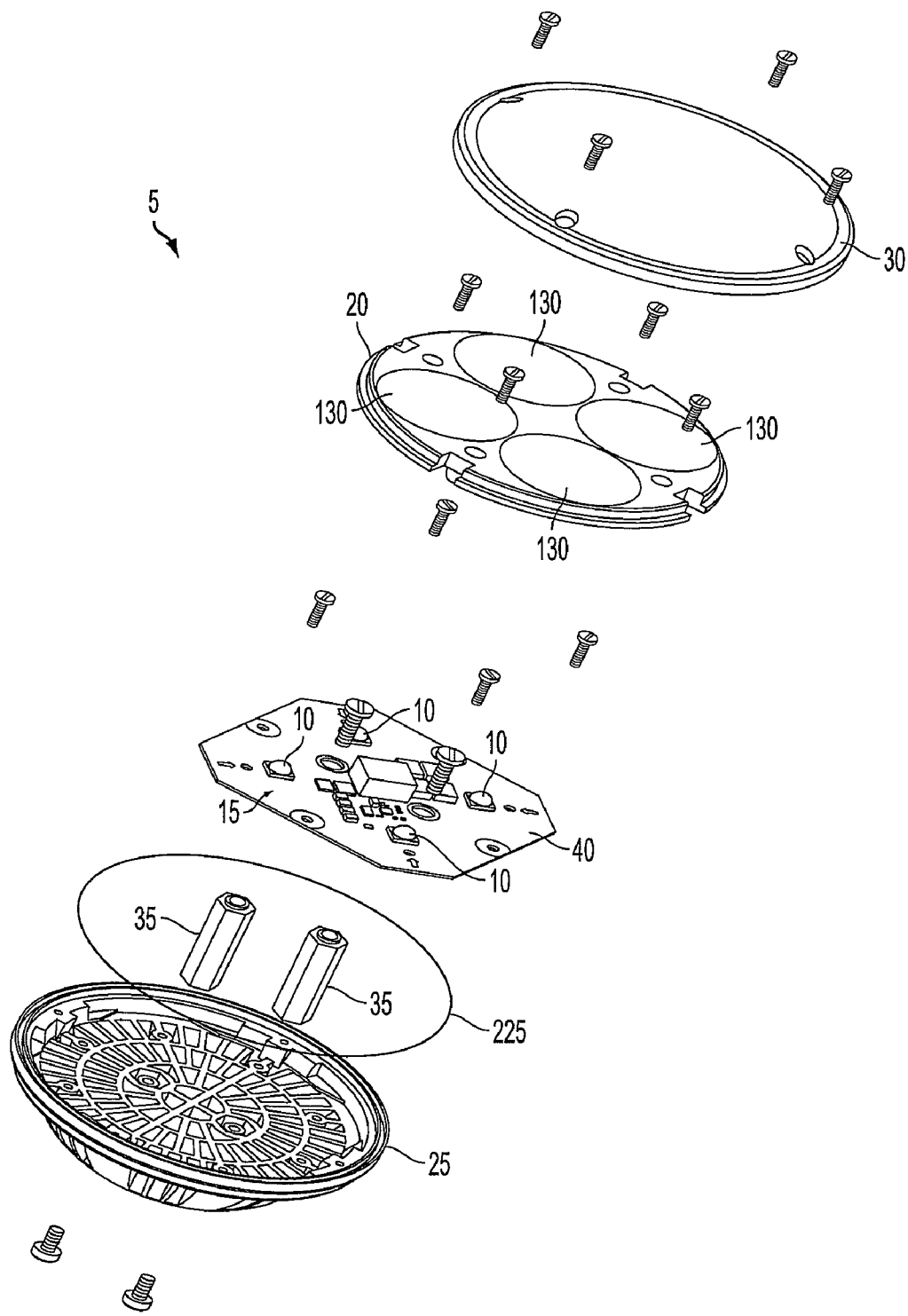
FIG. 3 is an exploded view of the lamp assembly of FIGS. 1A-1C.

FIGS. 1A, 1B and 1C are perspective views of a front, back and side, respectively, of a lamp assembly 5 according to one embodiment. FIG. 2 is a perspective cross-sectional view of the lamp assembly 5, and FIG. 3 is an exploded view of the lamp assembly 5 illustrating components thereof. As discussed in further detail below, embodiments of the lamp assembly 5 utilize light emitting diode (LED) technology to generate a light output. LEDs do not exhibit the large inrush current characteristics of incandescent filaments and are generally impervious to vibration. The lamp assembly 5 thus provides significantly greater operating lifetimes in harsh mechanical environments, such as, for example, aircraft, motorcycle and off-road vehicle (e.g., Baja 500) environments or the like than may be realized using incandescent filament technology. Advantages of the lamp assembly 5 are not limited to increased durability and longevity in harsh operating environments, and it will be appreciated that the lamp assembly 5 may be used in other operating environments, such as, for example, automobile forward lighting environments, marine (e.g., underwater) environments and stage lighting operating environments. Because embodiments of the lamp assembly 5 may utilize an array of total internal reflection (TIR) lenses to extract light from LEDs, the light may be collected and redirected more efficiently compared to non-TIR light processing elements used for external aircraft lighting and other applications. Moreover, because embodiments of the lamp assembly 5 may conform to certain mechanical, electrical and/or light output specifications of any of a number of existing incandescent filament lamps, aircraft, motorcycles, off-road vehicles and other equipment (vehicular or non-vehicular) may be retrofitted with the lamp assembly 5 without the need for substantial modification, if any, of the associated equipment.

With reference to FIG. 3, the lamp assembly 5 may comprise one or more light emitting diode (LED) arrays 10, a controller circuit 15 electrically coupled to the LED arrays 10, a lens array 20, a base 25 and a cover 30. In the assembled state of the lamp assembly 5, as shown in FIG. 2, the LED arrays 10, the controller circuit 15 and the lens array 20 may be received onto a front surface 195 of the base 25, with the cover 30 being disposed over the front surface 195 and attached to the base 25. The LED arrays 10, the controller circuit 15 and the lens array 20 may thus be protectably enclosed between the cover 30 and the base 25. The lamp assembly 5 may additionally comprise a set of electrical connectors 35 disposed through the base 25 between the front surface 195 of the base 25 and a back surface 200 of the base 25. As discussed in further detail below, the electrical connectors 35 enable an electrical power system external to the lamp assembly 5 (e.g., an aircraft electrical power system) to electrically connect to the LED arrays 10 and controller circuit 15 and supply electrical power thereto.

Figure 4A:
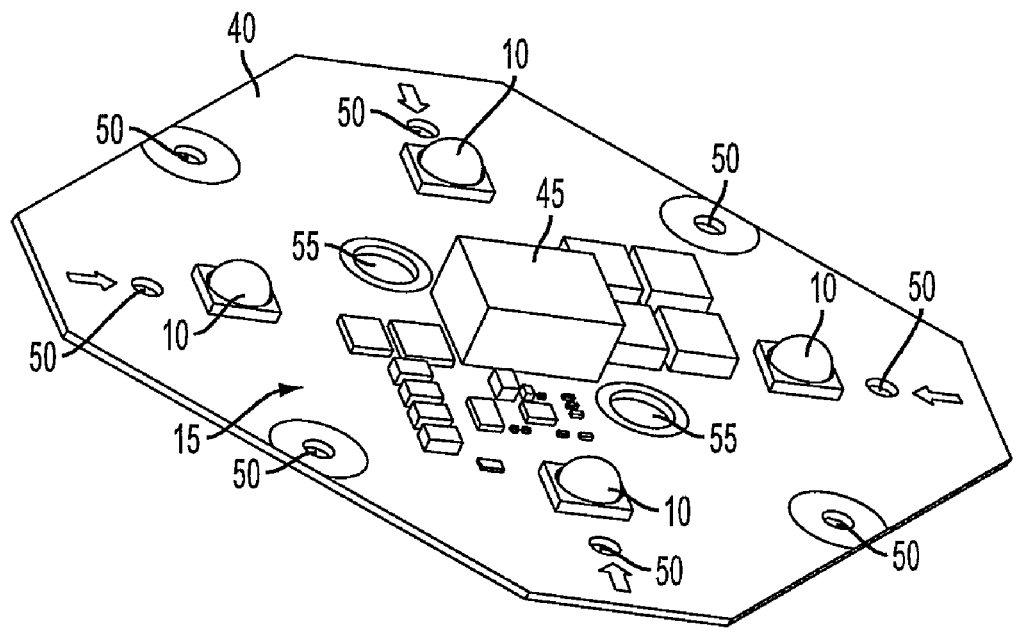
FIG. 4A illustrates a physical layout of the LED arrays and controller circuit of FIG. 3.
Figure 4B:
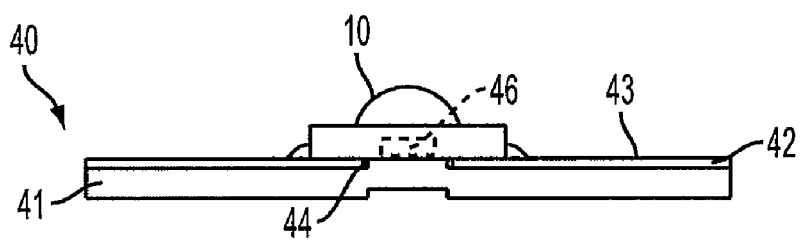
FIG. 4B illustrates a configuration of the PCB substrate of FIG. 4A according to one embodiment.

FIG. 4A illustrates a physical layout of the LED arrays 10 and controller circuit 15 of FIG. 3. As shown, the LED arrays 10 and controller circuit 15 may be mounted on a front surface of a printed circuit board (PCB) substrate 40, with the LED arrays 10 symmetrically spaced on an outer periphery of the substrate 40, and with the controller circuit 15 contained on a portion of the substrate 40 generally centered between the LED arrays 10. In certain embodiments and as shown in FIG. 4A, the lamp assembly 5 may comprise four LED arrays 10, although it will be appreciated that any number of LED arrays 10 may generally be used depending upon, for example, light output requirements of the particular lighting application and flux characteristics of the LED arrays 10. In certain embodiments and with reference to FIG. 4B, the substrate 40 may be in the form of a metal core PCB (MCPCB) comprising a metal base 41 (e.g., copper or aluminum), a dielectric layer 42 and a circuit layer 43 (e.g., copper) that are laminated together. At each location on the front surface of the substrate 40 at which an LED array 10 is mounted, a cutout 44 may be defined through the dielectric and circuit layers 42, 43 such at least a portion of each LED array 10 (e.g., an electrically insulated metal heat sink 46 of the LED array 10) is in direct thermal contact with the metal base 41. In one embodiment, for example, the heat sink 46 may be soldered to the metal base 41 via the cutout 44. In this way, a direct thermal path may be established between the LED arrays 10 and the base 25. In certain embodiments and as shown, the metal base 41 may be punched or slightly indented such that the portion of the metal base 41 exposed through each cutout is substantially flush with the front surface of the substrate 40. The LED arrays 10 and controller circuit 15 may be electrically connected by electrical conductors (not shown), such as, for example, electrical conductors formed in the circuit layer 43 using known circuit-forming technologies (e.g., photoengraving).

The front surface of the substrate 40 may comprise an alignment post 45 centered on the front surface and extending normally therefrom. When received into a corresponding alignment opening 150 (FIG. 8C) of the lens array 20, the alignment post 45 ensures proper alignment of the lens array 20 with the LED arrays 10. The substrate 40 may define a number of suitably positioned openings 50 for enabling attachment of the substrate 40 and the lens array 20 to the base 25, using for example, fasteners (e.g., screws) introduced through the openings 50 that are retained in openings 205, 215 defined by the base 25 (FIG. 10A). The substrate 40 may additionally comprise a set of electrical input connection points in the form of openings 55 defined by the substrate 40, with each opening 55 having a conductive periphery electrically coupled to a corresponding input of the controller circuit 15. In the assembled state of the lamp assembly 5 and with reference to FIG. 2, a fastener (e.g., a screw) received through each opening 55 may be retained by an end of a corresponding electrical connector 35, thereby mechanically anchoring the electrical connectors 35 to the substrate 40 and electrically connecting the electrical connectors 35 to the LED arrays 10 and controller circuit 15 via the conductive peripheries of the openings 55.

Figure 5B:
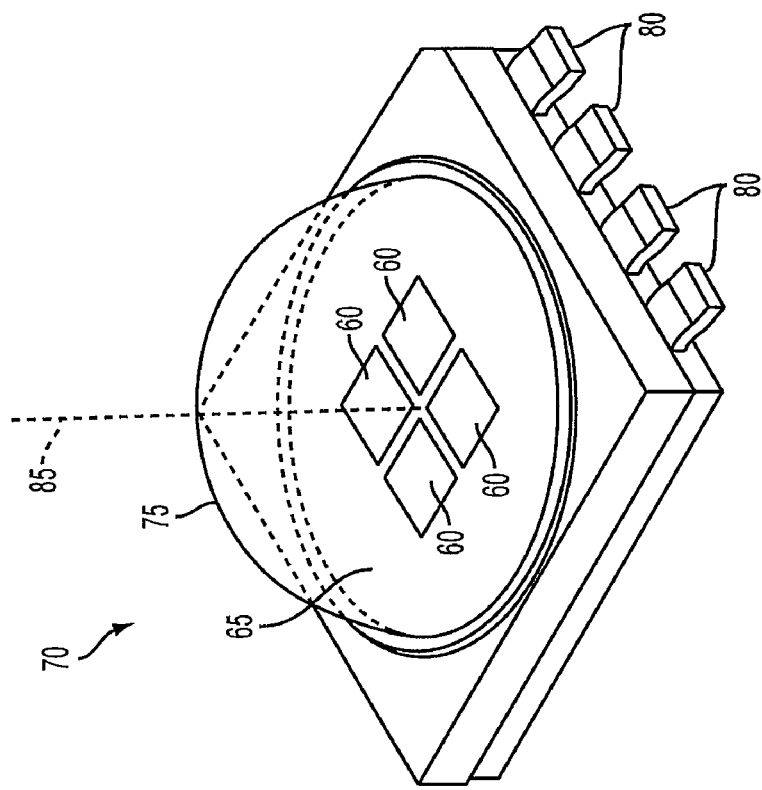
FIGS. 5A and 5B illustrate configurations of an LED array of FIG. 3 according to various embodiments.
Figure 5A:
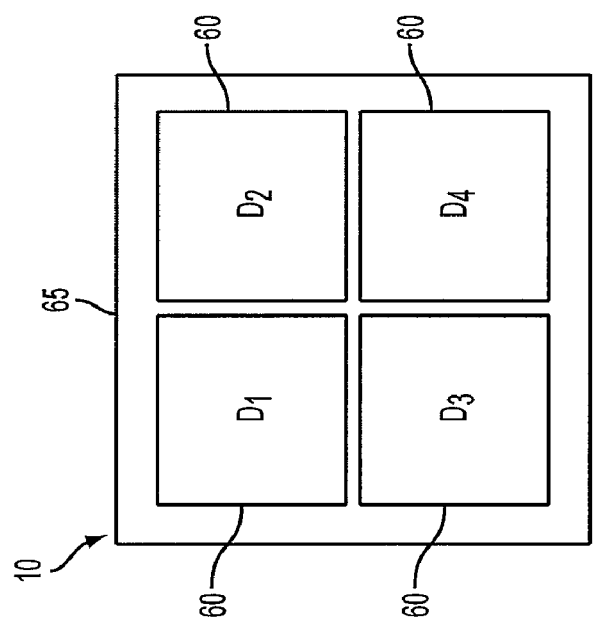

FIGS. 5A and 5B illustrate configurations of an LED array 10 of FIG. 3 according to various embodiments. In certain embodiments and with reference to FIG. 5A, the LED array 10 may comprise four LED die, or "LEDs," 60 ($D_1$-$D_4$), with the LEDs 60 mounted onto a substrate 65 (which may or may not be the same as substrate 40) in the general form of a square when viewed from their light-emitting surfaces. In one embodiment, all LEDs 60 of the LED array 10 may be configured to radiate electromagnetic energy at substantially the same wavelength, or at a number of wavelengths that are substantially the same. In another embodiment, at least one of the LEDs 60 may be configured to radiate electromagnetic energy at one or more wavelengths that are not transmitted by at least one other of the LEDs 60 of the LED array 10. The specific spectral output of the LED array 10 may be suitable for use in existing incandescent filament lamp applications, such as, for example, aircraft, motorcycle and off-road vehicle (e.g., Baja 500) applications, among others. Electrical connections to the LEDs 60 may be made through conventional electrical contacts.

Although the LED array 10 of FIG. 5A comprises four LEDs 60 arranged in a square-like configuration, it will be appreciated that that the LED array 10 may generally comprise one or more LEDs 60, and that the one or more LEDs 60 may be mounted onto the substrate 65 to form any of a number of geometrical shapes (e.g., circle, line, rectangle, triangle, rhombus, or any suitable polygonal shape) depending on, for example, the number of LEDs 60 and a desired light distribution. It will further be appreciated that the number of LEDs 60 in each LED array 10 of the lamp assembly 5 may or may not be the same. For example, in one embodiment all of the LED arrays 10 may comprise four LEDs 60, while in another embodiment a first LED array 10 may comprise four LEDs 60 and a second LED array 10 may comprise a number of LEDs 60 that is more or less than four. Similarly, it will be appreciated that the collective spectral output of each LED array 10 may or may not be the same as the spectral output of other LED arrays 10 of the lamp assembly 5.

In certain embodiments and with reference to FIG. 5B, the LED array 10 may be implemented using a commercially available LED package 70. The LED package 70 may be in the form of a surface-mount technology (SMT) component, for example, and comprise a number of LEDs 60 mounted onto a substrate 65, a lens 75 disposed over the LEDs 60, a heat sink (not shown) in thermal communication with the LEDs 60, and a set of pins or leads 80 electrically connected to each LED 60. In one such embodiment, for example, the LED package 70 may be implemented using an XLamp® MC-E LED package available from Cree, Durham, N.C.

The LED array 10 may define a spatial radiation pattern having a central axis 85 about which light emitted by the LED array 60 is distributed in a generally symmetrical manner. With reference to FIG. 5B, for example, the central axis 85 may be centrally located between the LEDs 60 and extend normally from the substrate 65. In certain embodiments, the central axis 85 may coincide with a viewing angle of the LED array 10 (e.g., 0 degrees) at which the relative luminous intensity of the LED array 10 is at a maximum.

Figure 6:
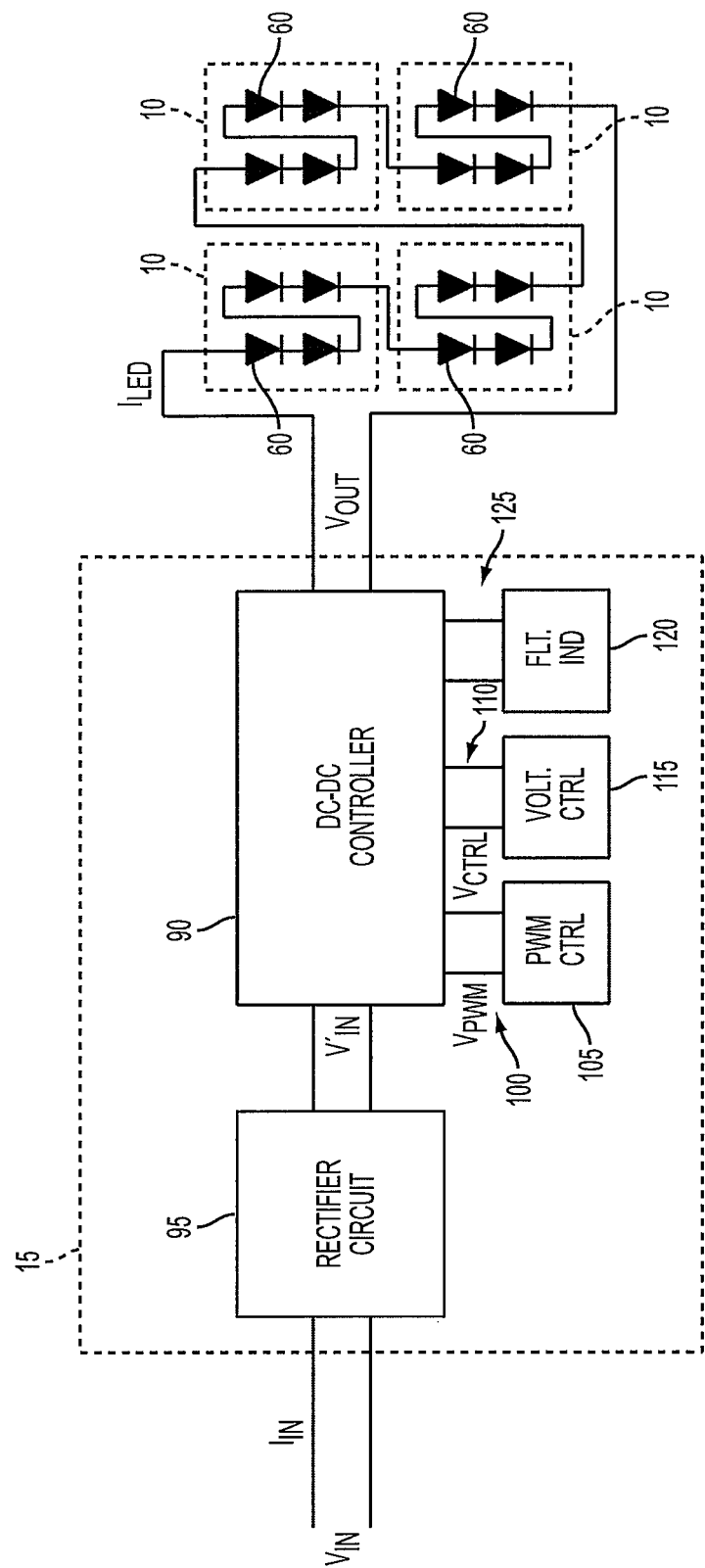
FIG. 6 is a block diagram of the LED arrays and controller circuit of FIG. 3 according to one embodiment.
Figure 7A:
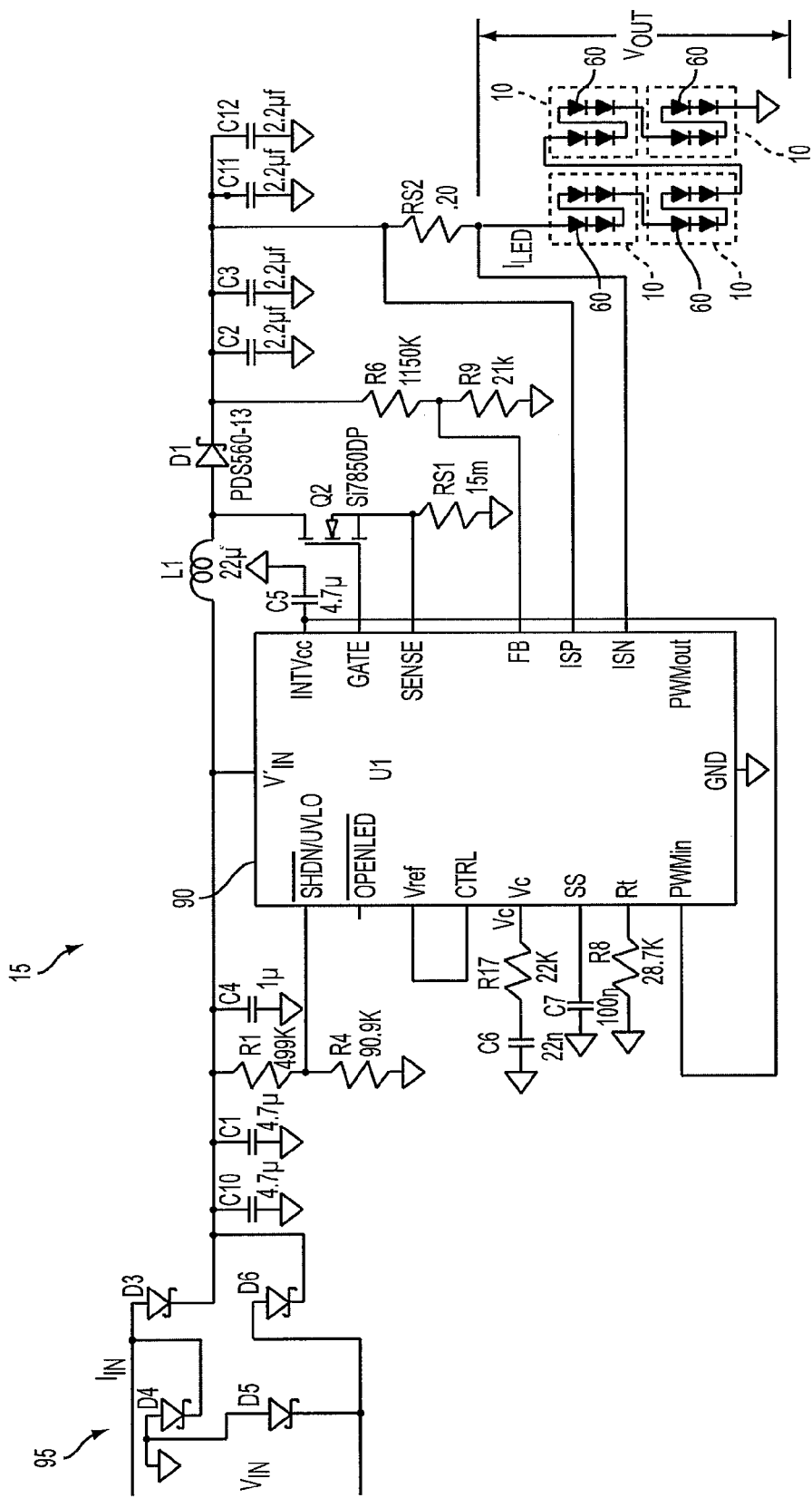
FIGS. 7A and 7B are circuit layouts of the LED arrays and controller circuit of FIG. 3 according to various embodiments.
Figure 7B:
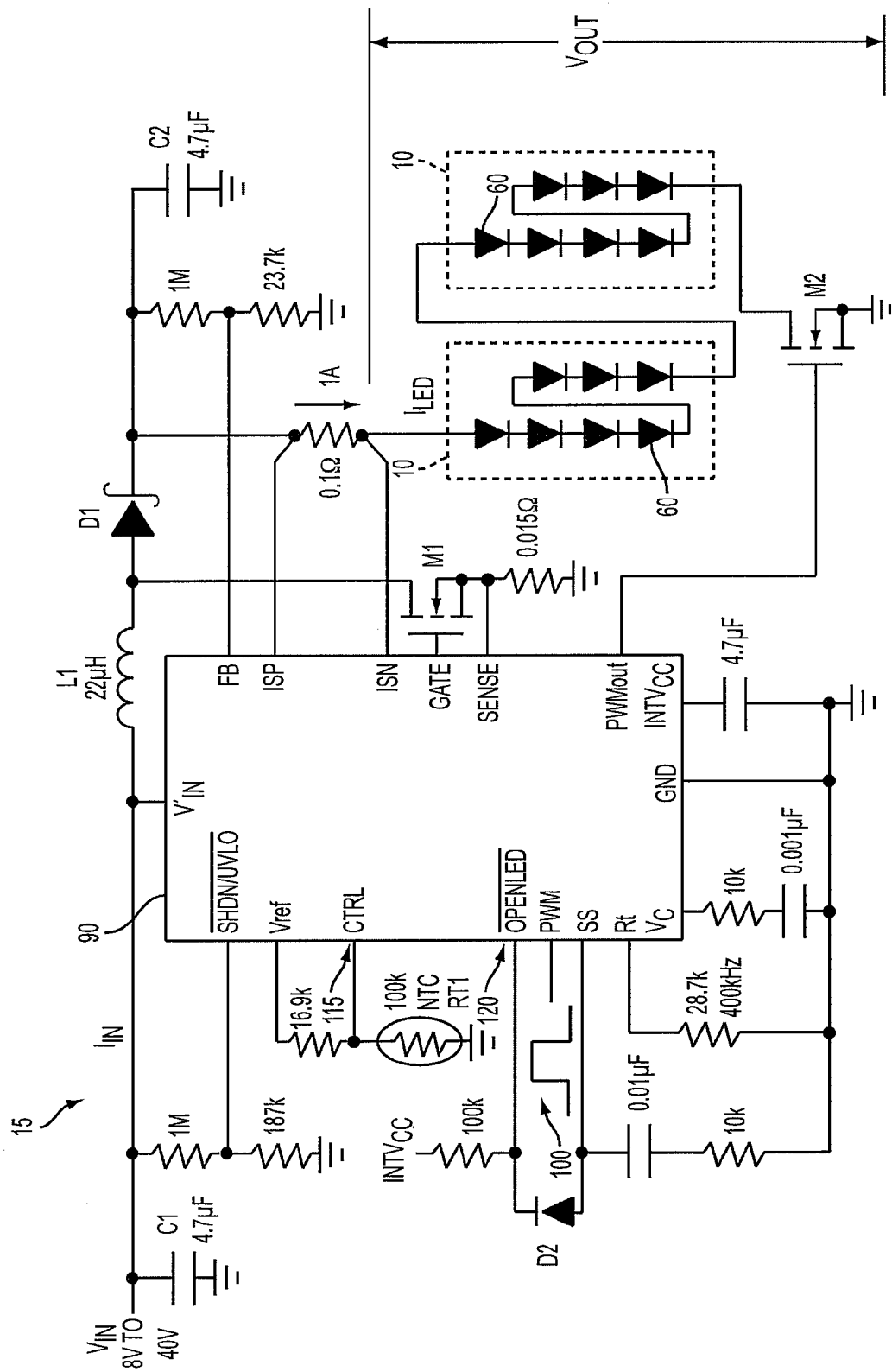

FIG. 6 is a block diagram of the LED arrays 10 and controller circuit 15 of FIG. 3 according to one embodiment. During operation of the lamp assembly 5, the controller circuit 15 functions as a current source to supply operating power to the LED arrays 10 in the form of an output voltage $V_{OUT}$ and an output current $I_{LED}$. In certain embodiments and as discussed above, the lamp assembly 5 may comprise four LED arrays 10, with each LED array 10 comprising four LEDs 60. In the embodiment of FIG. 6, the LED arrays 10 and the LEDs 60 in each LED array 10 are connected in a series configuration to define a 16-LED string. Because the LED arrays 10 require constant current to produce a light output having a constant brightness, the controller circuit 15 may comprise a DC-DC controller 90, such as a DC-DC switching controller, operating as a constant current source. In certain embodiments, the DC-DC controller 90 may be implemented using a commercially available DC-DC switching controller package, such as the LT3755 DC-DC switching controller available from Linear Technology, Milpitas, Calif. (FIGS. 7A and 7B).

In certain embodiments, the controller circuit 15 may be configured for bipolar operation to ensure that an operating voltage of proper polarity is applied to inputs of the DC-DC controller 90 irrespective of the polarity of the input voltage $V_{IN}$ applied to inputs of the controller circuit 15. In one embodiment, for example, the controller circuit 15 may comprise a bridge rectification circuit 95 for receiving an input voltage $V_{IN}$ at either polarity and outputting a voltage of constant polarity to serve as the operating voltage of the DC-DC controller 90 ($V'_{IN}$). The bridge rectification circuit 95 may comprise, for example, four diodes connected in a bridge rectifier configuration. In certain embodiments, the diodes of the bridge rectification circuit 95 may comprise relatively low voltage drops (i.e., Schottky diodes) such that power consumption of the circuit 95 is reduced, although it will be appreciated that other types of diodes may be used instead. The bridge rectification circuit 95 thus ensures that an operating voltage $V'_{IN}$ of proper polarity is applied to the DC-DC controller 90 regardless of the polarity of the input voltage $V_{IN}$ applied to the controller circuit 15, thereby simplifying installation of the lamp assembly 5 and protecting against component damage that might otherwise result from a reversed polarity of the input voltage $V_{IN}$.

In certain cases, and especially those in which the LED arrays 10 and LEDs 60 are connected in a series configuration, the forward voltage required to drive the LEDs 60 may exceed an available input voltage $V_{IN}$. For example, the forward voltage required to drive the 16-LED chain of FIG. 6 may range from about 45 to 70 VDC, while the nominal value of the input voltage $V_{IN}$ may be approximately 14 or 28 VDC (e.g., in the case of aircraft lighting applications). Accordingly, in certain embodiments, the DC-DC controller 90 may be configured to operate in a boost mode whereby the output voltage $V_{OUT}$ of the controller circuit 15 is suitably increased above the operating voltage $V'_{IN}$ supplied to inputs of the DC-DC controller 90 via the bridge rectification circuit 95 (e.g., approximately 14 or 28 VDC) such that the output voltage $V_{OUT}$ satisfies the forward voltage requirements of the LEDs 60 (e.g., 45 to 70 VDC). In order to accommodate unexpected fluctuations of $V_{IN}$ from its nominal value, the controller circuit 15 may be configured to maintain a suitable output voltage $V_{OUT}$ over a range of input voltage $V_{IN}$ values. In one embodiment, for example, the controller circuit 15 may be designed to generate a suitable output voltage $V_{OUT}$ based on nominal input voltages of 14 or 28 VDC, but may nonetheless maintain a suitable output voltage $V_{OUT}$ for input voltages $V_{IN}$ within a range of approximately 4.5 to 40 VDC. It will be appreciated that the values of $V_{IN}$ and $V_{OUT}$ described above are provided by way of example only, and that embodiments of the controller circuit 15 may generally be configured to operate using different values of $V_{IN}$ and $V_{OUT}$ based on, among other things, available input voltages $V_{IN}$, the number of LED arrays 10, the number of LEDs 60 in each array, and the manner in which the LED arrays 10/LEDs 60 are connected (e.g., series configuration, parallel configuration, or a combination thereof). According to various embodiments, for example, the DC-DC controller 90 may be configured to operate in a buck mode (e.g., in cases in which the forward voltage required to drive the LED arrays 10 is less than $V_{IN}$) or in a buck-boost mode (e.g., in cases in which $V_{IN}$ may initially be larger than the forward voltage required to drive the LED arrays 10 but subsequently decreases below the required forward voltage, such as may occur in battery-powered LED applications).

According to various embodiments, the controller circuit 15 may comprise at least one control input for receiving a signal to selectively control the amount of current $I_{LED}$ in the LEDs 60, thus enabling dimmability of the LEDs 60. In certain embodiments, such as those in which the DC-DC controller 90 is implemented using the LT3755 DC-DC switching controller, for example, the DC-DC controller 90 may comprise a first control input 100 to receive a pulse-width modulated (PWM) waveform (e.g., $V_{PWM}$ in FIG. 6) to control a switch duty cycle of the DC-DC controller 90 such that the output current $I_{LED}$ may be modulated substantially between zero and full current based on a PWM dimming ratio of the PWM waveform. The PWM dimming ratio may be calculated as the ratio of the maximum PWM period to the minimum PWM pulse width and may have a maximum value of 1500:1, for example. In certain embodiments and as shown in FIG. 6, the controller circuit 15 may comprise a PWM controller 105 for outputting a user-controllable (e.g., using a potentiometer or jumpers coupled to the PWM controller 105) PWM waveform to the first control input 100 of the DC-DC controller 90. In other embodiments, the PWM waveform may be supplied from a user-controllable PWM waveform source external to the lamp assembly 5.

In addition or as an alternative to the use of a PWM waveform to control output current $I_{LED}$ via a first control input 100, certain embodiments of the controller circuit 15, such as those in which the DC-DC controller 90 is implemented using the LT3755 DC-DC switching controller, for example, may comprise a second control input 110 to control the amount of current $I_{LED}$ in the LEDs 60 based on DC voltage signal $V_{CTRL}$ applied to the second control input 110. For example, when $V_{CTRL}$ is maintained above a threshold value (e.g., 1.1 VDC), the current $I_{LED}$ may be dictated by the combined resistances $R_{LED}$ of the LEDs 60, e.g., $I_{LED}$ is about 100 mV/$R_{LED}$. When $V_{CTRL}$ is reduced below the threshold value, the current $I_{LED}$ may be dictated by the values of both $R_{LED}$ and $V_{CTRL}$, e.g., $I_{LED}$ is about ($V_{CTRL}$−100 mV)/$R_{LED}$. In accordance with this example, for a threshold value of 1.1 VDC, the current $I_{LED}$ may be varied substantially between zero and full current by suitably varying $V_{CTRL}$ between about 100 mVDC and about 1.1 VDC, respectively. In certain embodiments, the controller circuit 15 may comprise a voltage controller 115 for deriving a value of $V_{CTRL}$ from another voltage present within the controller circuit 15 (e.g., $V_{IN}$). In one embodiment, for example, the voltage controller 115 may be implemented using a potentiometer to enable manual adjustment of $V_{CTRL}$, and thus $I_{LED}$, by a user. In another embodiment, voltage controller 115 may be implemented using a thermistor to automatically adjust $V_{CTRL}$ based on a temperature sensed within the lamp assembly 5 (FIG. 7B). For example, an NTC (negative temperature coefficient) thermistor may be coupled to the second control input 110 such that decreasing thermistor resistance (indicative of increasing temperature) causes $V_{CTRL}$ to decrease, thus decreasing $I_{LED}$. Conversely, increasing thermistor resistance (indicative of decreasing temperature) may cause $V_{CTRL}$ to increase, thus increasing $I_{LED}$. In this way, if a temperature within the lamp assembly 5 becomes excessive due to, for example, environmental conditions, the controller circuit 15 may compensate by reducing the output current $I_{LED}$ to reduce the amount of heat dissipated by the LED arrays 10 and controller circuit 15, thus maintaining the reliability and operating lifetime of the lamp assembly 5.

In embodiments in which the LED arrays 10 and LEDs 60 are connected in a series configuration, such as that of FIG. 6, it will be appreciated that failure of a single LED 60 may cause the failure of the entire LED chain if, for example, the LED fails in an open circuit mode. Accordingly, a failure of the LED chain due to an open LED mimics the failure of an incandescent filament. In order to provide a positive confirmation that a lack of output light is due to an open LED, the controller circuit 15 may comprise a fault indicator 120 to indicate the existence of this condition. In certain embodiments of the controller circuit 15, such as those in which the DC-DC controller 90 is implemented using the LT3755 DC-DC controller, for example, the DC-DC controller 90 may comprise an open LED output 125 (e.g., an open-drain status output) that electrically transitions (e.g., pulls low) when an open LED fault is detected by the DC-DC controller 90. The transition of the open LED output 125 may be used to control operation of the fault indicator 120. In one embodiment, for example, the transition of the open LED output 125 may cause a driver circuit (not shown) of the controller circuit 15 to energize a low-power LED of the fault indicator 120 that is visible through the lens array 20 and cover 30 to provide a visual indication of the open LED fault. In another embodiment, the fault indicator 120 may not be a component of the lamp assembly 5 and instead may be located remotely therefrom, such as on a dashboard or display that is visible to an operator.

According to various embodiments, the DC-DC controller 90 may be configured to turn off when the input voltage $V_{IN}$ of the controller circuit 15 (or the input voltage $V'_{IN}$ of the DC-DC controller 90) falls below a pre-determined turn-off threshold and to subsequently resume operation when the input voltage $V_{IN}$ rises above a pre-determined turn-on threshold. In one embodiment, for example, although it may be feasible to operate the controller circuit 15 using input voltage $V_{IN}$ in a range of approximately 4.5 to 40 VDC, the controller circuit 15 may nonetheless be configured to turn off when the input voltage $V_{IN}$ falls below 10 VDC (turn-off threshold), for example, and to subsequently resume operation when the input voltage $V_{IN}$ rises to a pre-determined value above the turn-off threshold, such as 10.5 VDC (turn-on threshold), for example. In certain embodiments of the controller circuit 15, such as those in which the DC-DC controller 90 is implemented using the LT3755 DC-DC switching controller, for example, the turn-off and turn-on thresholds may be programmed using an external resistor divider connected to a shutdown/undervoltage control input (FIGS. 7A and 7B) of the DC-DC controller 90. In this way, when the voltage of the electrical power system falls below a pre-determined value (due to an electrical malfunction or low battery charge, for example), the electrical load represented by the DC-DC controller 90 and LEDs 60 may be removed from the electrical power system.

FIG. 7A is a circuit layout of the LED arrays 10 and controller circuit 15 of FIG. 3 according to one embodiment. The LED arrays 10 are implemented using XLamp® MC-E LED packages available from Cree, and the DC-DC controller 90 is implemented using the LT3755 DC-DC controller available from Linear Technology. The controller circuit 15 of FIG. 7A is operable using an input voltage $V_{IN}$ within a range of about 8 to about 40 VDC and outputs a regulated current $I_{LED}$ of about 505 mA at an output voltage $V_{OUT}$ of about 70 VDC. The turn-off and turn-on thresholds are about 8 and 9 VDC, respectively, and are programmed using an external resistor divider (R1 and R4) connected to the SHDN/UVLO control input.

FIG. 7B is a circuit layout of the LED arrays 10 and controller circuit 15 of FIG. 3 according to another embodiment. The DC-DC controller 90 is implemented using the LT3755 DC-DC controller, and the two LED arrays 10 each include seven LEDs. The control circuit 15 of FIG. 7B is operable using an input voltage $V_{IN}$ within a range of about 8 VDC to about 40 VDC and outputs a regulated current $I_{LED}$ of about 1000 mA at an output voltage $V_{OUT}$ of about 50 VDC. The current $I_{LED}$ in the LEDs 60 is user-adjustable via the PWM control input to control LED dimming. The current $I_{LED}$ is also controlled based on temperature by a resistor bridge comprising an NTC thermistor connected to the CTRL control input. The turn-off and turn-on thresholds are programmed using an external resistor divider connected to the SHDN/UVLO control input and are about 7 and 8 VDC, respectively.

FIGS. 8A, 8B and 8C are front, back and cross-sectional views, respectively, of the lens array 20 of FIG. 3. The lens array 20 may comprise, for each LED array 10, a total internal reflection (TIR) lens 130 to redirect light received from the LED array 10 along optical paths that are convergent, divergent or substantially parallel relative to a central axis 135 defined by the TIR lens 130. For example, for a lamp assembly 5 comprising four LED arrays 10 as shown in the embodiment of FIG. 3, the lens array 20 may comprise four TIR lenses 130. In certain embodiments, the lens array 20 may be in the general shape of a disk and integrally formed using a suitable optical material (e.g., plastic, glass), although it will be appreciated that in other embodiments each TIR lens 130 of the lens array 20 may be formed as a separate element. In the assembled state of the lamp assembly 5 and with reference to FIGS. 2-3, the lens array 20 may be disposed over the LED arrays 10, with each TIR lens 130 being located over a corresponding LED array 10 and separated therefrom by virtue of standoffs 140 formed on a periphery of a back surface of the lens array 20. Each standoff 140 may define an opening 145 therethrough to enable attachment of the lens array 20 to the base 25 using, for example, a fastener (e.g., screw, rivet, snap) that extends through the opening 145 from a front surface of the lens array 20 to be retained by a corresponding opening 205 defined by the front surface 195 of the base 25. To ensure proper alignment of the TIR lenses 130 with the LED arrays 10, the back surface of the lens array 20 may define a centrally-located alignment opening 150 configured to receive the alignment post 45 of the substrate 40 (FIG. 4) only when the TIR lenses 130 and the LED arrays 10 are properly aligned. In other words, the alignment opening 150 may be polarized relative to the alignment post 45. In one embodiment, proper alignment of the TIR lens 130 with a corresponding LED array 10 is determined by the alignment of the central axis 85 of the LED array 10 (FIG. 5B) with the central axis 135 of the TIR lens 130 (FIG. 8C).

With reference to FIG. 8C, each TIR lens 130 may comprise multiple and concentrically arranged annular facets 155 having tips 160 progressively closer to a plane 165 normal to the central axis 135. Each facet 155 may comprise an entry face 170 and a TIR face 175, and each TIR lens 130 may comprise an exit face 180 having, for example, a convex surface. FIGS. 9A, 9B and 9C illustrate, for various TIR lens configurations, redirection of light emitted by a light source 185 (e.g., an LED array 10) located at an intersection of the plane 165 with the central axis 135. In FIG. 9A, light rays 190 emitted from the light source 185 are passed through the entry faces 170, refracted toward the TIR faces 175, and reflected toward and passed through the exit face 180. In certain embodiments and as shown in FIG. 9A, the angularity of the facets 155 may be such that the light rays are convergent relative to the central axis 135. In other embodiments, the angularity of the facets 155 may be such that the light rays are divergent (FIG. 9B) or collimated (FIG. 9C) relative to the central axis 135. It will thus be appreciated that the TIR lens 130 may be used to form uniform distributions of light exiting the exit face 180 of the TIR lens 130. Additional TIR lens configurations suitable for use in the lens array 20 are disclosed, for example, in U.S. Pat. No. 4,337,759 to Popovich et al., U.S. Pat. No. 5,404,869 to Parkyn, Jr. et al., and U.S. Pat. No. 5,655,832 to Pelka et al., each of which is incorporated herein by reference in its entirety.

Figure 10B:
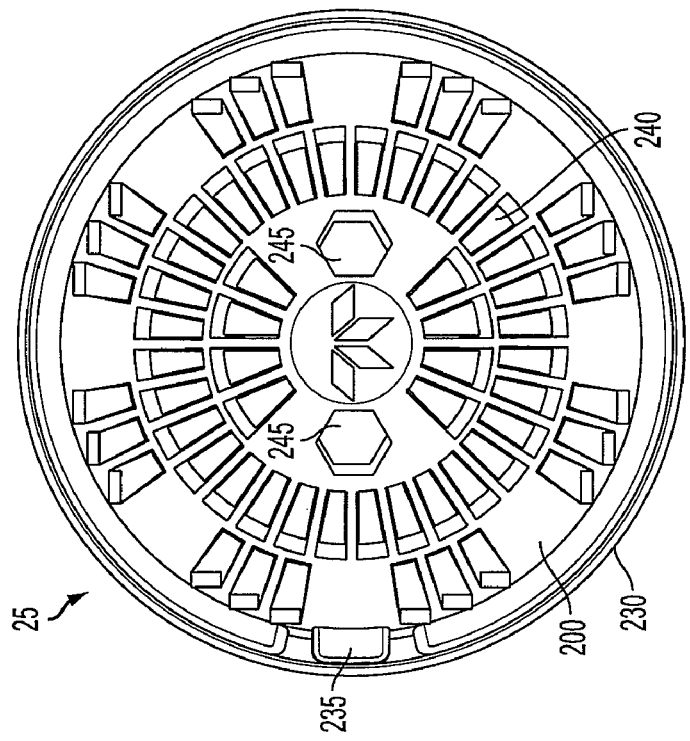
FIGS. 10A, 10B and 10C are front, back and perspective side views, respectively, of the base of FIG. 3.
Figure 10A:
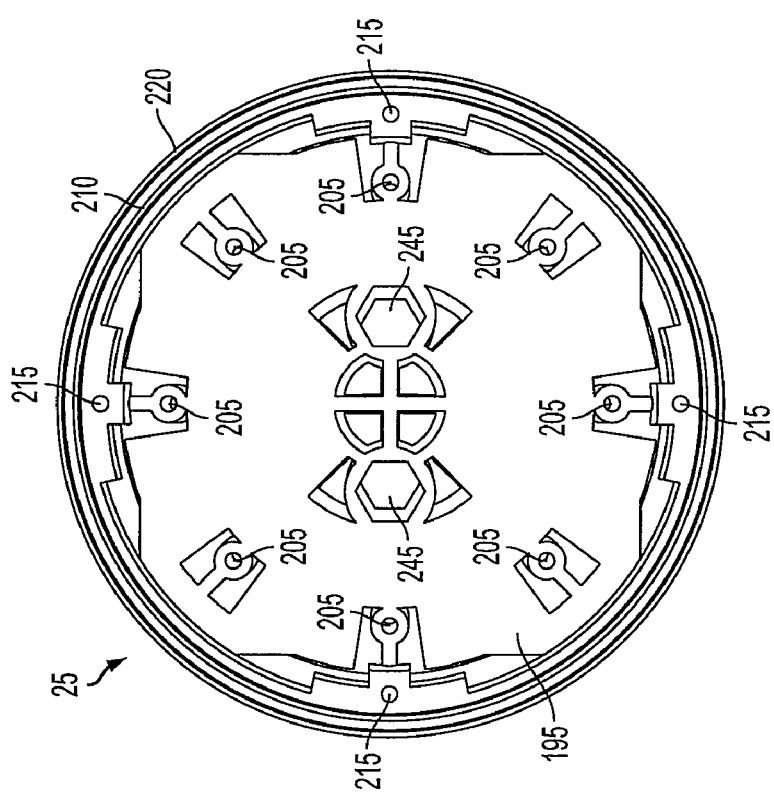
Figure 10C:
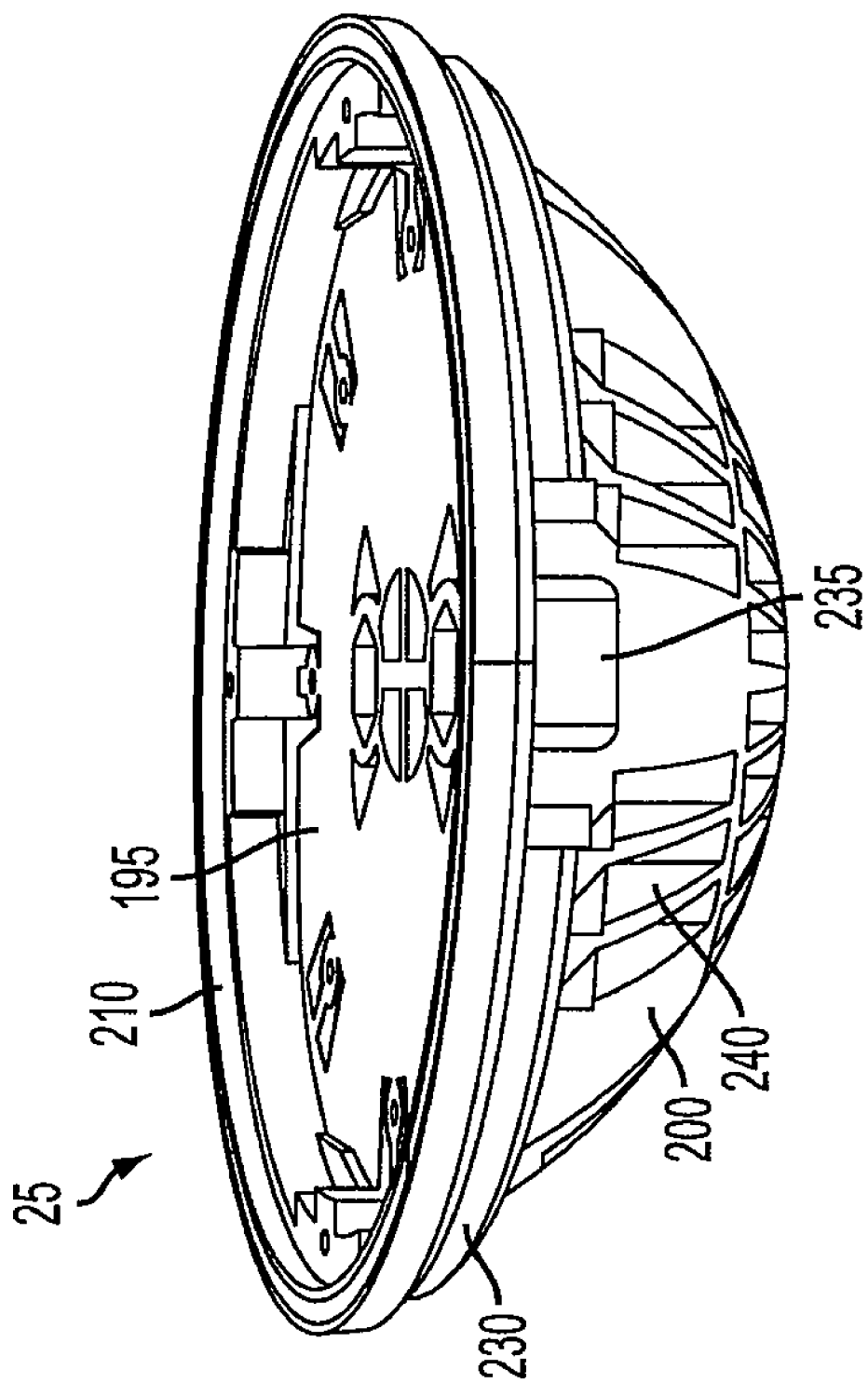

FIGS. 10A, 10B and 10C are front, back and perspective side views, respectively, of the base 25 of FIG. 3. The base 25 may be generally circular in shape when viewed from the front and back and comprise a front surface 195 to receive the LED arrays 10 and controller circuit 15 (e.g., via the substrate 40) and the lens array 20. The base 25 may also comprise a back surface 200 opposite the front surface 195 that is structured to be removably received by lamp holder, such as, for example, an incandescent lamp holder. To maintain a suitable temperature of the lamp assembly 5 during its operation, the base 25 may be configured to receive and dissipate heat generated by the LED arrays 10 and controller circuit 15. The base 25 may therefore comprise a material having a suitably high thermal conductively, such as, for example, aluminum or copper. It will be appreciated, however, that the base 25 may additionally or alternatively comprise other materials, such as thermoplastic, for example. In certain embodiments, the base 25 may be formed as a single element using, for example, a die casting or injection molding process. The front surface 195 may be generally planar and define a number of openings 205 to retain fasteners (e.g., screws) for attaching the LED arrays 10, the controller circuit 15 and the lens array 20 to the front surface 195. The base 25 may additionally comprise a lip 210 disposed about a periphery of the front surface 195 to receive the cover 30. The lip 210 may define a number of openings 215 to retain fasteners (e.g., screws) for attaching the cover 30 to the lip 210. The lip 210 may additionally define a groove 220 to receive a gasket 225 (FIG. 3), such as, for example, an elastomeric O-ring gasket. In the assembled state of the lamp assembly 5, the gasket 225 be disposed between and compressed by the cover 30 and the base 25 to form a weather-tight barrier between the cover 30 and the base 25.

With reference to FIG. 10C, the back surface 200 of the base 25 may comprise a generally outward-curving geometry, such as, for example, a circular paraboloid geometry, that is suitably dimensioned for removable receipt by a lamp holder designed to accommodate a lamp having a standard shape and size. In certain embodiments, for example, the back surface 200 may be dimensioned for removable receipt by a conventional incandescent lamp holder designed to accommodate a parabolic aluminum reflector (PAR) lamp, such as, for example, a PAR-36 lamp, a PAR-56 lamp or a PAR-64 lamp. The back surface 200 may also define a collar 230 disposed about a periphery of the back surface 200 adjacent the lip 210, at least a portion of which is configured for removable engagement by a corresponding portion of the lamp holder when the lamp assembly 5 is received therein. In certain embodiments, the engaged portion of the collar 230 may be suitably smooth to provide a weather-tight seal between the collar 230 and an opposing gasket of the lamp holder. The back surface 200 may additionally define a key 235 adjacent the collar 230 to be removably received into a corresponding slot of the lamp holder, thereby ensuring proper rotational alignment of the lamp assembly 5 with the lamp holder.

In certain embodiments and as shown in FIGS. 10B and 10C, the front and back surfaces 195, 200 may define a plurality of close-ended openings 240 that substantially increase the surface area of the surfaces 195, 200. The collective surfaces of the openings 240 thus provide a cooling structure to increase the heat-dissipative properties of the base 25.

As shown in FIGS. 10A and 10B, the base 25 may define a set of apertures 245 extending between and connecting the front and back surfaces 195, 200 of the base 25 in order to accommodate the set of electrical connectors 35 of the lamp assembly 5 (FIG. 3). The apertures 245 may be located such that, in the assembled state of the lamp assembly 5, openings of the apertures 245 on the front surface 195 are respectively aligned with electrical input connection points (e.g., openings 55) of the substrate 40. Additionally, openings of the apertures 245 may define a non-circular shape (e.g., a hexagon) to prevent rotation of similarly-shaped electrical connectors 35 within the apertures 245.

Figure 11A:
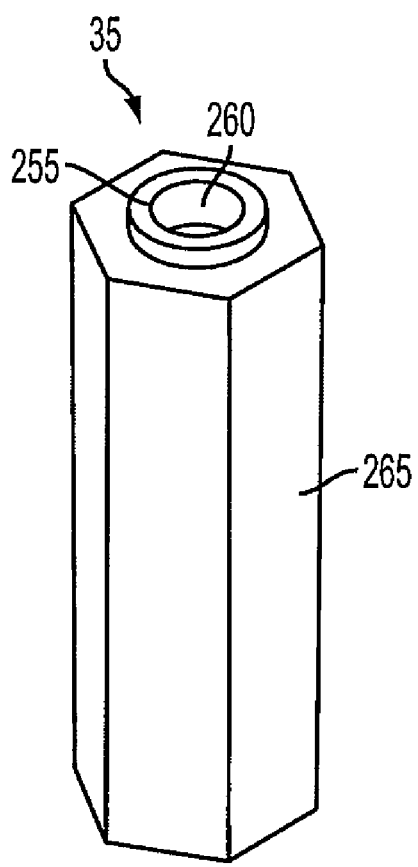
FIGS. 11A and 11B are perspective views of one of a set electrical connectors of FIG. 3 according to one embodiment.
Figure 11B:
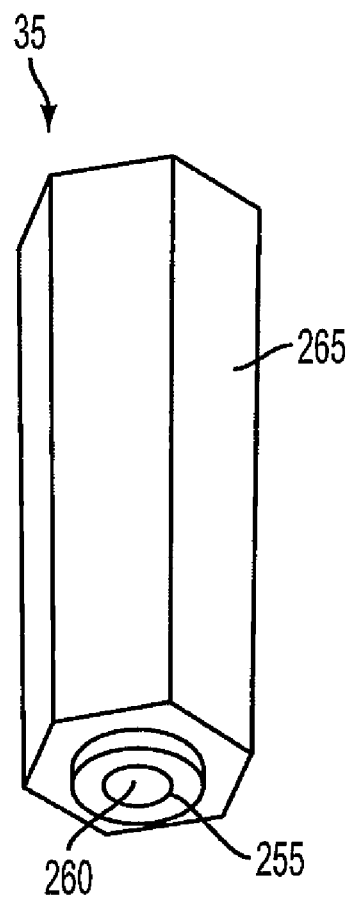

FIGS. 11A and 11B are perspective views of one of the set of electrical connectors 35 of the lamp assembly 5 according to one embodiment. Each connector 35 may comprise a conductor 255 in the form of metal rod defining an opening 260 at each end configured to retain a fastening member (e.g., a screw). The connector 35 may further comprise an electrical insulator 265 (e.g., a nylon resin) formed on an exterior surface of the conductor 255 such that each end of the conductor 255 and its respective opening 260 are the only exposed portions of the conductor 255. The electrical insulator 265 may define a shape that conforms to the shape of the apertures 245 defined by the base 25. For example, as shown in FIGS. 11A and 11B, the electrical insulator 265 may define a hexagonal shape that conforms to the hexagonal shape of the apertures 245 of FIGS. 10A and 10B.

In the assembled state of the lamp assembly 5 and with reference to FIG. 2, the electrical connectors 35 may respectively extend through the apertures 245 of the base 25, with a first end of each connector 35 being electrically coupled to the controller circuit 15 by, for example, a fastener (e.g., screw, rivet, snap) that extends through a corresponding opening 55 of the substrate 40 to be retained in an opening 260 of the electrical connector 35. In this way, the first end of each electrical connector 35 may be electrically coupled to the controller circuit 15 via the conductive periphery of the openings 55. A second end of each electrical connector 35 may be accessible from the back surface 200 of the base 25 and be electrically connected to an electrical power system external to the lamp assembly 5 using, for example, a fastener (e.g., a screw) retained in an opening 260 of the electrical connector 35. As will be appreciated from FIG. 2, the conductor 255 of each electrical connector 35 is electrically insulated from the base 25 by virtue of the electrical insulator 265 formed on the exterior surface of the conductor 255. In certain embodiments, a sealant and/or adhesive material may be disposed between each electrical insulator 265 and the inner surface of its corresponding aperture 245 to provide a weather-tight barrier between the electrical connectors 35 and the base 25 and/or to ensure a suitably strong mechanical bond therebetween.

Figure 12B:
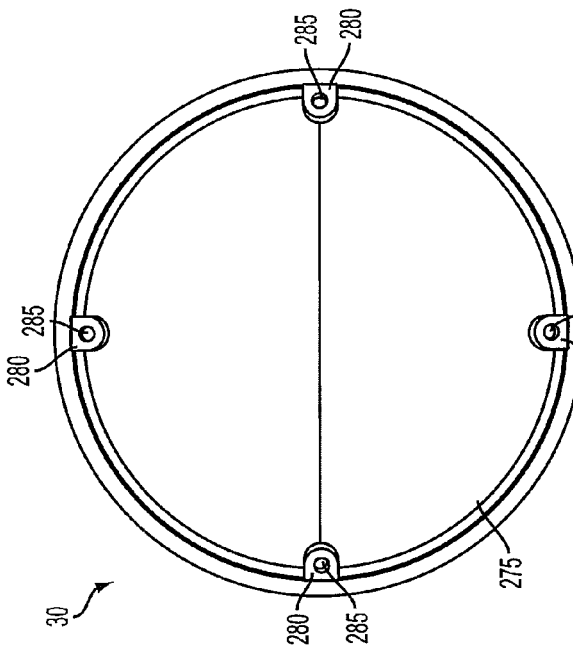
FIGS. 12A, 12B and 12C are front, back and perspective side views, respectively, of the cover of FIG. 3.
Figure 12C:
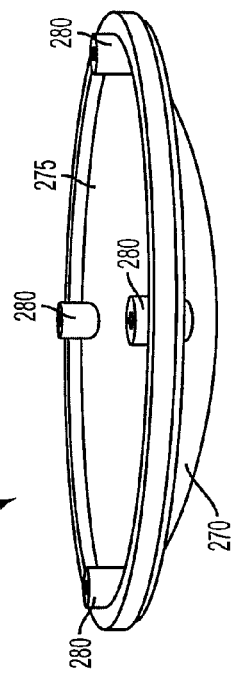
Figure 12A:
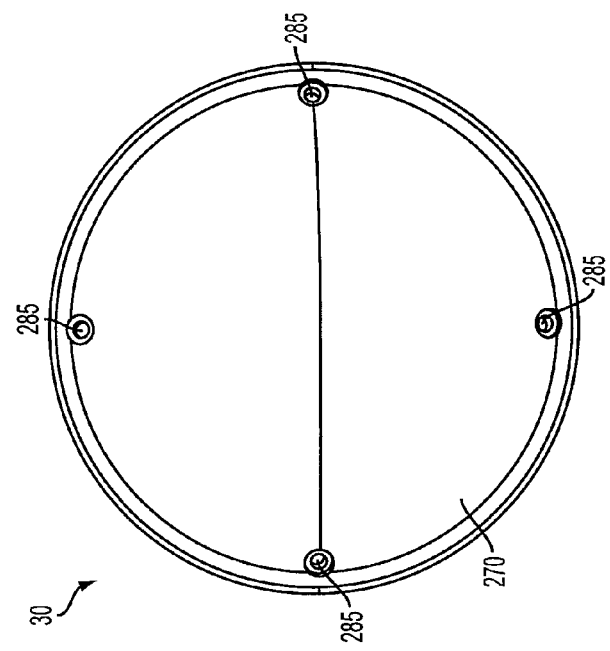

FIGS. 12A, 12B and 12C are front, back and perspective side views, respectively, of the cover 30 of FIG. 3. As shown, the cover 30 may be in the general shape of a disc and comprise a convex front surface 270 and a concave back surface 275. It will be appreciated that one or more of the surfaces 270, 275 may alternatively comprise another suitable surface profile, such as a flat profile, for example. The cover 30 may be integrally formed from a suitably light-transmissive material, such as a clear polycarbonate material, for example. A diameter of the cover 30 may be such that, in the assembled state of the lamp assembly 5, a peripheral portion of the back surface 275 opposes the lip 210 of the base 25. As discussed above, the gasket 225 may be disposed between and compressed by the cover 30 and the base 25, thereby forming a weather-tight barrier therebetween. With reference to FIG. 12C, the cover 30 may comprise standoffs 280 formed on a periphery of the back surface 275 that correspond in number to the openings 215 of the lip 210. Each standoff 280 may define an opening 285 therethrough that, in the assembled state of the lamp assembly 5, aligns with a corresponding opening 215 of the lip 210. The cover 30 may thus be attached to the base 25 using, for example, a faster (e.g., a screw) that extends through each opening 285 from the front surface 270 to be retained in the corresponding opening 215 of the lip 210.

Figure 13A:
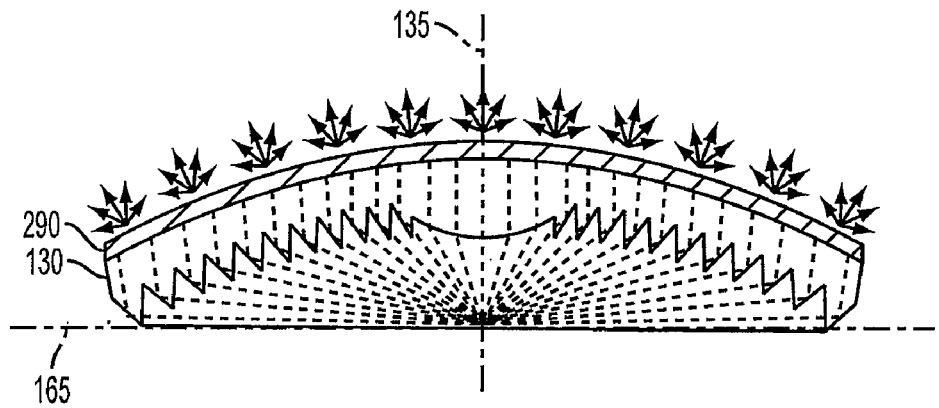
FIGS. 13A and 13B illustrate diffuser optics according to various embodiments.
Figure 13B:
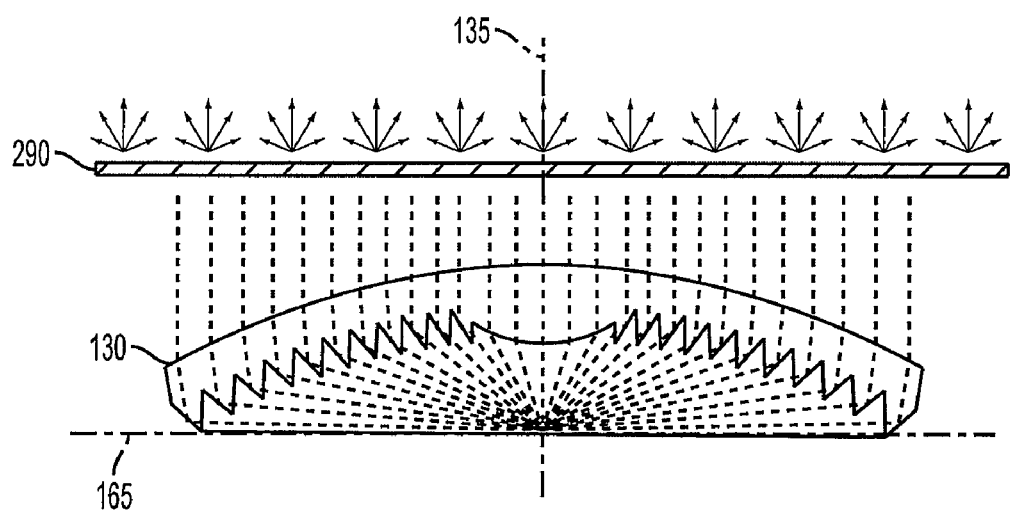

According to various embodiments, the lamp assembly 130 may comprise one or more diffuser optics for modifying a distribution of light emitted by the TIR lens 130. In certain embodiments, a diffuser optic may be formed on the surface of the exit face 180 (FIG. 8C) of each TIR lens 130, as shown in FIG. 13A, or on a surface of the cover 30. In other embodiments, diffuser optics may be formed as separate elements. As shown in FIG. 13B, for example, diffuser optic 290 may be formed as an element that is separate from the TIR lenses 130. The diffuser optic(s) 290 may be configured to shape light emitted from the TIR lens 130 to conform to a particular shape or a predetermined field-of-view. As shown in FIGS. 13A and 13B, for example, diffuser optics 290 operate to spread the light distributed from the exit face 180 of the TIR lens 130, thus increasing the angular spectrum of illumination. In certain embodiments, the diffuser optic(s) 290 may be implemented using a diffuse glass or plastic. In other embodiments, the diffuser optics(s) 290 may be implemented using a holographic diffuser, otherwise known as a kinoform diffuser. Examples of holographic diffusers are described in "An Overview of LED Applications for General Illumination" (Conference Proceedings Paper), David G. Pelka, Kavita Patel, SPIE Vol. 5186, November 2003; and "Keen Forms of Kinoforms—Kinoform-based Diffusers Help Lighting Designers Leverage Unique LED Advantages," David G. Pelka, OE Magazine, Vol. 3 No. 10, p. 19, October 2003, both of which are incorporated herein by reference. In other embodiments, the diffuser optic(s) 290 may be formed using microlens arrays comprising multiple lenses formed in a two-dimensional array on a supporting substrate, such as those manufactured by Rochester Photonics Corp., Rochester, N.Y.

Figure 14:
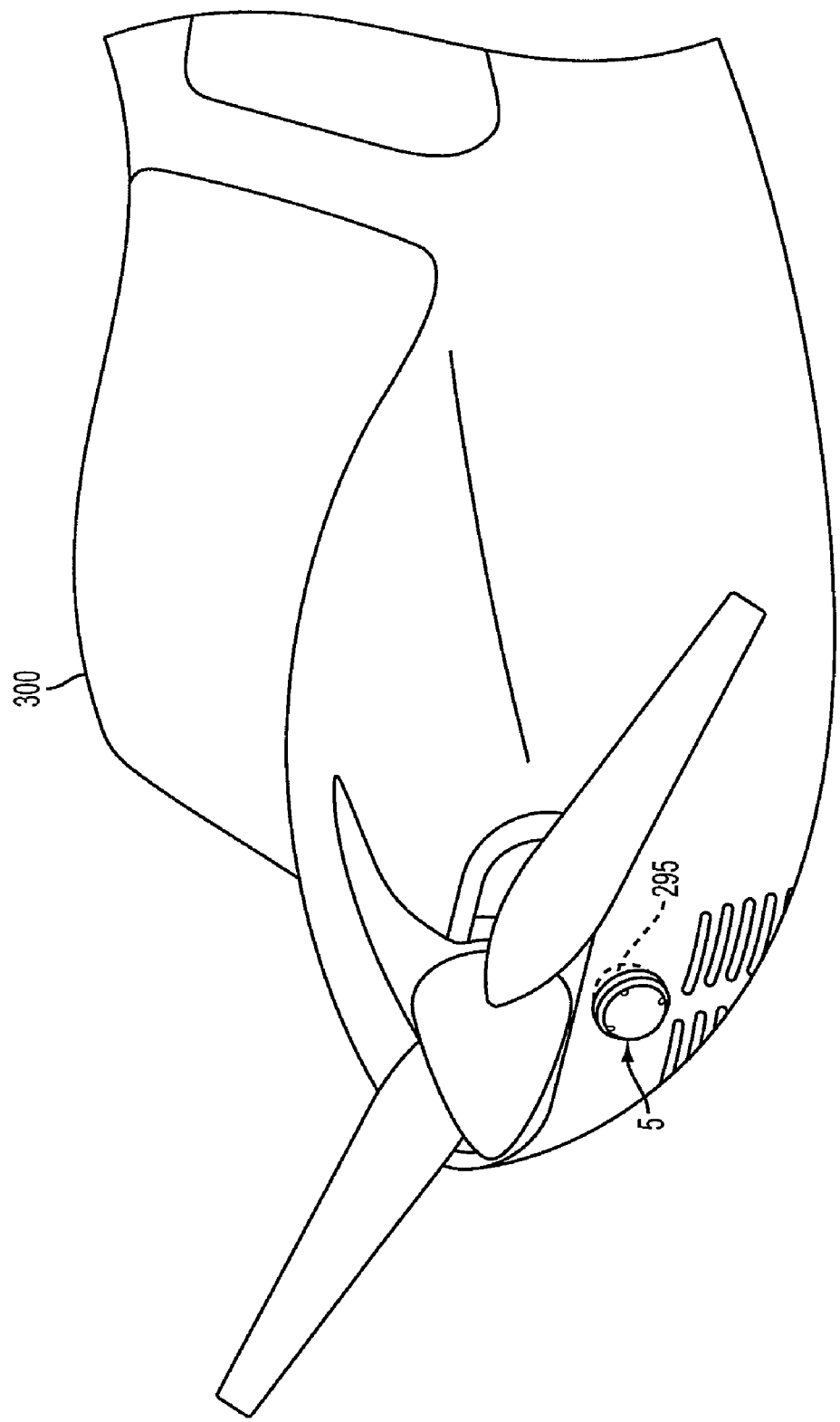
FIG. 14 illustrates an installed configuration of the lamp assembly of FIGS. 1A-1C according to one embodiment.

FIG. 14 illustrates an installed configuration of the lamp assembly 5 of FIGS. 1A-1C according to one embodiment. As shown, the lamp assembly 5 is retrofitted into a cowl-mounted PAR-36 incandescent lamp holder 295 of an aircraft 300 to operate as an aircraft landing light. It will be appreciated that the lamp assembly 5 may also be used in other harsh operating environments such as, for example, motorcycle and off-road vehicle (e.g., Baja 500) environments. Notwithstanding the advantages of increased durability and longevity afforded by the lamp assembly 5 in such environments, it will be appreciated that the lamp assembly 5 may be used in a number of other operating environments, such as, for example, automobile forward lighting environments, marine (e.g., underwater) environments and stage lighting operating environments.

While various embodiments of the invention have been described herein, it should be apparent, however, that various modifications, alterations and adaptations to those embodiments may occur to persons skilled in the art with the attainment of some or all of the advantages of the present invention. The disclosed embodiments are therefore intended to include all such modifications, alterations and adaptations without departing from the scope and spirit of the present invention as set forth in the appended claims.

What is claimed is:

1. A lamp assembly, comprising:
one or more light emitting diode (LED) arrays, wherein each one of the one or more LED arrays comprises at least one LED and defines a spatial radiation pattern having a first central axis;
a controller circuit to output a current to the one or more LED arrays;
a lens array to redirect light received from the one or more LED arrays, wherein the lens array comprises, for each one of the one or more LED arrays, a total internal reflection (TIR) lens defining a second central axis aligned with the first central axis of the corresponding LED array, wherein the TIR lens comprises multiple facets having tips progressively closer to a plane normal to the second central axis, the facets of the TIR lens to distribute light received from the corresponding LED array from an output face of the TIR lens, wherein the angularity of the facets determines the distributed light defining optical paths that are convergent, divergent or collimated with respect to the second central axis, and wherein the LED array is located behind an input face of the TIR lens;
a base comprising a first surface to receive the one or more LED arrays, the controller circuit and the lens array, and a second surface structured to be removably received by a lamp holder; and
a light-transmissive cover attached to the base and disposed over the first surface thereof such that the one or more LED arrays, the controller circuit and the lens array are contained between the cover and the base.

2. The lamp assembly of claim 1, wherein the one or more LED arrays comprise at least two LEDs connected in series.

3. The lamp assembly of claim 2, comprising four LED arrays.

4. The lamp assembly of claim 3, wherein each LED array comprises four LEDs.

5. The lamp assembly of claim 1, wherein the controller circuit comprises a DC-DC switching controller to output the current to the one or more LED arrays.

6. The lamp assembly of claim 5, wherein the DC-DC switching controller is configured to operate in a boost mode such that an output voltage of the DC-DC switching controller is greater than an input voltage of the DC-DC switching controller.

7. The lamp assembly of claim 6, wherein the output voltage of the DC-DC switching controller is about 45 VDC to 70 VDC, and wherein the input voltage of the DC-DC switching controller is about 4.5 VDC to 40VDC.

8. The lamp assembly of claim 7, wherein the input voltage of the DC-DC controller is about 14 VDC.

9. The lamp assembly of claim 7, wherein the input voltage of the DC-DC controller is about 28 VDC.

10. The lamp assembly of claim 5, wherein the DC-DC switching controller is configured to operate in a buck mode such that an output voltage of the DC-DC switching controller is less than an input voltage of the DC-DC switching controller.

11. The lamp assembly of claim 5, wherein the DC-DC switching controller is configured to operate in a buck-boost mode.

12. The lamp assembly of claim 5, wherein the controller circuit comprises a pulse-width modulation (PWM) controller to input a PWM waveform to a first control input of the DC-DC switching controller, wherein the DC-DC switching controller is to control the current to the one or more LED arrays based on the PWM waveform input to the first control input.

13. The lamp assembly of claim 5, wherein the controller circuit comprises a voltage controller to input a voltage to a second control input of the DC-DC switching controller, wherein the DC-DC switching controller is to control the current to the one or more LED arrays based on the voltage input to the second control input.

14. The lamp assembly of claim 5, wherein the controller circuit comprises a bridge rectifier circuit to receive an input voltage having one of a first polarity and a second polarity and to generate an output voltage having a constant polarity, wherein the output voltage of the bridge rectifier circuit is an input voltage of the DC-DC switching controller.

15. The lamp assembly of claim 1, wherein the controller circuit comprises an indicator to indicate an LED fault of the one or more LED arrays.

16. The lamp assembly of claim 1, wherein the controller circuit comprises a temperature sensor to sense an operating temperature of the lamp assembly, and wherein the controller circuit is to control the current to the one or more LED arrays based on the sensed operating temperature.

17. The lamp assembly of claim 1, wherein at least a portion of the controller circuit is configured to shutdown when an input voltage to the controller circuit is less than a predetermined threshold value.

18. The lamp assembly of claim 17, wherein the predetermined threshold value is about 10 VDC.

19. The lamp assembly of claim 1, wherein at least one of the cover and a TIR lens comprises a diffuser.

20. The lamp assembly of claim 19, wherein the diffuser comprises a microlens array.

21. The lamp assembly of claim 1, comprising a first electrical connector and a second electrical connector, wherein the first and second electrical connectors respectively extend through first and second apertures defined by the base, the first and second apertures extending between and connecting the first and second surfaces of the base, wherein a first end of each electrical connector is electrically connected to the controller circuit, and wherein a second end of each electrical connector is accessible from the second surface and configured electrically to connect to a corresponding electrical conductor of the lamp holder.

22. The lamp assembly of claim 1, wherein the second surface is structured in accordance with parabolic aluminum reflector (PAR) lamp standard.

23. The lamp assembly of claim 1, wherein at least one of the first surface and the second surface comprises a cooling structure for dissipating heat generated by the one or more LED arrays and the controller circuit.

24. The lamp assembly of claim 1, further comprising at least a second lens array located in a co-planar relationship with the lens array.

25. The lamp assembly of claim 24, wherein the second lens array comprises, for each one of a second one or more LED arrays, a second total internal reflection (TIR) lens defining a second central axis aligned with the first central axis of the corresponding second LED array, wherein the second TIR lens comprises multiple facets having tips progressively closer to a plane normal to the second central axis, the facets of the second TIR lens to distribute light received from the corresponding second LED array from an output face of the second TIR lens, wherein the angularity of the facets determines the distributed light defining optical paths that are convergent, divergent or collimated with respect to the second central axis, and wherein the second LED array is located behind an input face of the second TIR lens.

* * * * *